July 17, 1934.   L. L. LUSTICK   1,967,151
AUTOMOBILE BRAKE
Filed Dec. 16, 1933
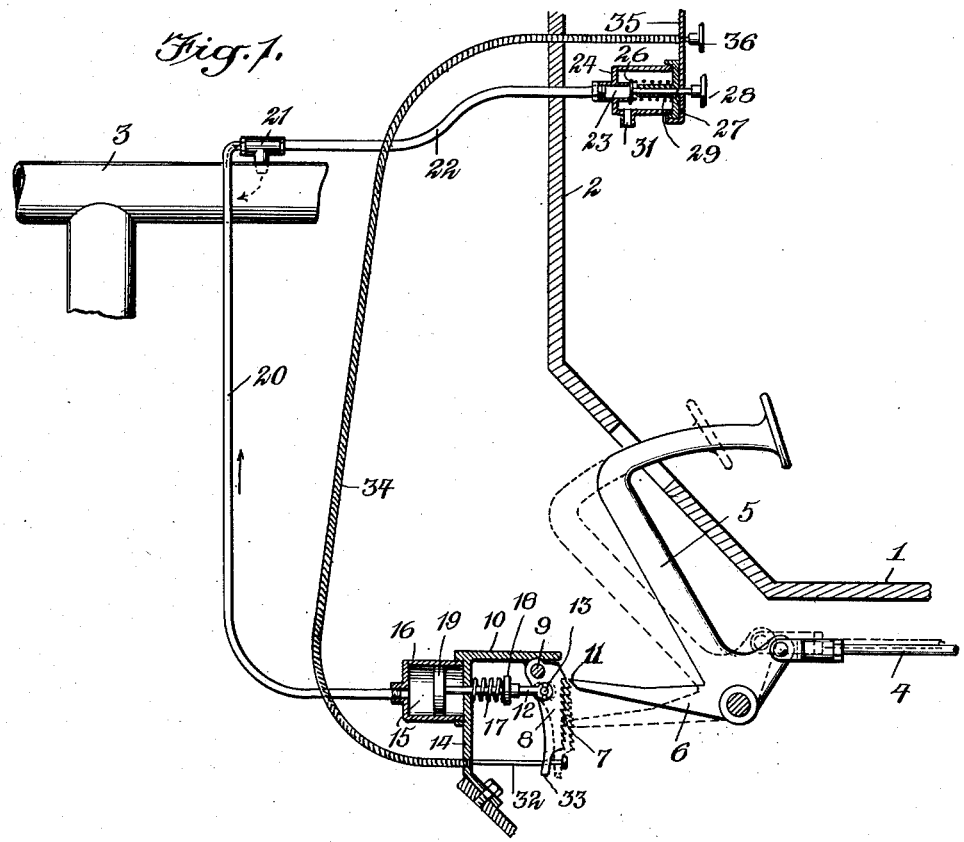
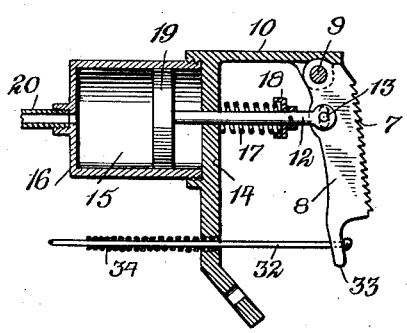
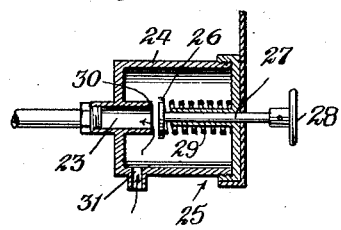
WITNESSES
INVENTOR
Ludwig L. Lustick
BY
ATTORNEYS Patented July 17, 1934

1,967,151

UNITED STATES PATENT OFFICE 1,967,151

AUTOMOBILE BRAKE

Ludwig Lawrence Lustick, Traunik, Mich., assignor of one-half to John Knaus, Jr., Trenary, Mich.

Application December 16, 1933, Serial No. 702,809

8 Claims. (Cl. 188—265)

This invention relates to brakes and particularly to an improved brake for automobiles, the object being to provide a structure wherein the usual brake mechanism is used in both the capacity of an emergency or hand brake and as a service brake.

Another object of the present invention is to provide an improved construction which may be readily connected up to automobiles now in use whereby the usual emergency hand brake may be eliminated and the service brake used in place thereof when parking.

A further object of the invention, more specifically, is to provide an attachment to be applied to automobiles now in use or to new automobiles wherein means are presented for automatically holding the brake mechanism in its locked position when the engine is stopped.

An additional object is to provide an atachment for automobiles which coacts with the usual brake pedal thereof for holding the brake pedal in lowered position and the brakes in braking position either when the engine is stopped or when it is running, the structure being such that the holding means may be quickly moved to inoperative or neutral position either manually or through the action of the engine, whereby the brakes will be released and allowed to function normally.

In the accompanying drawing—

Figure 1 is a schematic view partly in section showing part of an automobile including part of the intake manifold and an embodiment of the invention;

Figure 2 is an enlarged fragmentary sectional view similar to the lower part of Figure 1, but illustrating the parts in operative position;

Figure 3 is an enlarged vertical section of a manually actuated air intake forming certain features of the invention;

Referring to the accompanying drawing by numerals 1 indicates the usual floor of an automobile, and 2 the instrument board. Immediately in front of the instrument board 2 is the usual intake manifold 3 of the engine. The intention is to provide means whereby the service brakes of the automobile may be readily used at any time as parking brakes instead of the usual hand braking mechanism now in common use. In carrying out this idea the usual brake rod 4 is connected in any desired manner to the usual brake pedal 5. The pedal 5, however, is provided with a special extension 6 which forms part of the present invention. This extension coacts with the various teeth 7 on the pivotally mounted lever 8, said lever being pivotally mounted at 9 on a supporting casing 10, which casing is bolted or otherwise rigidly secured in any manner to the chassis of the automobile, when the lever 8 is in its operative position, as shown in full lines in Figure 2 and in dotted lines in Figure 1, the various teeth 7 will be arranged at a slight angle so that the chamfered end 11 of extension 6 may be moved to interlock with any desired tooth according to the amount of depression of the pedal 5. When the end 11 is engaging any of the teeth 7 the brake pedal 5 cannot return and, consequently, the brake rod 4 will be kept under tension and the service brakes held in braking position. A rod 12 is pivotally connected with the lever 8 at 13 and extends through the wall 14 into the chamber 15 of the cylinder 16. A compressing spring 17 continually acts on the wall 14 and on a suitable abutment 18 carried by the rod 12 for normally holding the parts in position, as shown in Figure 2, with the lever 8 in its outer position ready to be engaged by the extension 6. It will be noted that the piston 19 rigidly secured to rod 12 is near wall 14 when the lever 8 is in its outer position. A tube 20 is in free communication with chamber 15 and extends to a fitting 21 which is a T-fitting with one leg connected to the manifold 3. The fitting 21 is in free communication at all times with the interior of the manifold 3 so that when the engine is running there will be produced a suction or rarefaction in the pipe 20 and also in chamber 15, whereupon the piston 19 will be pulled against the action of spring 17 so as to swing lever 8 over to an inoperative position as shown in full lines in Figure 1. During the action of the engine this suction is continued, but if the engine should be stopped for any reason the suction would cease and immediately spring 17 will function to force lever 8 to the right as shown in Figure 1, so that the teeth 7 will be in the path of movement of the extension 6 when the brake pedal 5 is forced downwardly.

It will thus be seen that when the brake mechanism has once been operated it will remain in operative position so that the service brakes will act as parking brakes. As the service brakes will naturally give a tendency to extension 6 to swing upwardly there will be a certain pressure exerted by this extension against the particular tooth 7 engaged. After the engine has been stopped and the brake operated and the engine again started, suction will not be sufficient to swing the lever 8 to the left as shown in Figure 1. In view of this fact the operator merely steps on the brake pedal to force the same downwardly a very short distance. This will take all the pressure of extension 6 from lever 8 and the rarefaction produced in chamber 15 will quickly cause the piston 19 and associated parts to function to swing lever 8 to the full line position shown in Figure 1. As long as the engine is running there is ample rarefaction to keep the parts in this position and, consequently, the service brakes may be applied and released freely.

If it should be desired to use the service brakes for parking purposes while the engine is running, the air valve shown in Figure 3 is used. It will be noted that a pipe 22 extends from the fitting 21 and is connected to the tubular member 23 of the casing 24 of the air valve 25. A valve member 26 is provided and connected to the rod 27 which rod extends beyond the casing 24 and is provided with a hand operated knob 28. The spring 29 acts against the end of the housing 24 and against the valve member 26 to normally hold the same against the seat 30 formed on the end of the tubular member 23. When it is desired to allow spring 17 to function to swing lever 8 to operative position while the engine is running, the knob 28 is pulled outwardly against the action of spring 29, whereupon air will pass through the port 31 into housing 24 and thence through the tubular member 23 into the pipe 22. This air is discharged into the fitting 21 and some finds its way out into the intake manifold 3. However, only sufficient air is admitted to permit spring 27 to function, and when this spring has functioned and the extension 6 is interlocked with one of the teeth 7, the valve member 26 is allowed to reseat itself, whereupon the rarefaction in the chamber 15 will be reestablished but the braking mechanism would not be released.

The engine may then continue to idle and when it is desired to drive the automobile the brake lever 5 is merely thrust downwardly slightly and will then release lever 8 so that it will move out of the way and allow pedal 5 to move back to its neutral position and, consequently, allow the service brakes to move to a disengaged position.

As an emergency brake in case the suction does not function as desired to release lever 8, a pull wire 32 extends loosely through the extension 33 of lever 8 and slidingly through the flexible casing 34, which casing extends from wall 14 to and through the instrument board 2. The casing 34 is connected in any desired manner to the plate 35, while the end of the sliding wire 32 is connected to a hand knob 36. When the knob 36 is pulled it will swing lever 8 to the left, as shown in Figure 1, and therefore will permit the brake lever 5 to function in the usual manner. After the parts have been operated by this emergency mechanism, knob 36 is forced back against plate 35 and the wire takes the position shown in Figure 1, whereby lever 8 is free to swing back and forth.

When the device is applied to an automobile and the car is standing still with the engine stopped, the driver may use the automobile by starting the engine running in the usual manner, and when the engine has been started he merely gives pedal 5 a little push whereupon it will be released and the brakes will also be released. The car may then be operated in the usual manner as if the attachment was not in use.

In case the car should be brought to a standstill without stopping the engine, the lever 8 will still remain out of the path of movement of extension 6. This will allow the automobile to stop at a stop light or upon a signal from an officer without having the brakes locked in braking position. As soon as it is permitted the driver merely moves his foot from pedal 5 and drives in the usual way. The only time that lever 8 will operate automatically to swing outwardly or to the right as in Figure 1 when the engine stops. If the brake should not be in braking position when this occurs the operator may merely push down on brake pedal 5 to the desired extent and the end 11 will merely slip over the teeth 7 by reason of the inclination thereof, but when it stops it will interlock and will not return until the lever 8 has been swung to the left.

It will thus be seen that the device will not function to lock the brakes while the engine is running unless said action is taken by the driver, namely, the pulling of the knob 28.

I claim:—

1. A device of the character described and in combination with the intake manifold and brake mechanism of an automobile, an extension rigidly secured to the brake pedal of the automobile provided with a pointed end, a pivotally mounted lever having a toothed edge adapted to interlock with said pointed end when the lever is in a given position, whereby said extension, brake pedal and brake mechanism are held against movement in one direction whereby the brake mechanism is maintained in a locked position, resilient means tending continually to swing said lever to a position to be engaged by the pointed end of said extension, and means connected with said intake manifold for causing the suction thereof to swing said lever to an inoperative position against the action of said resilient means, whereby said extension on said brake pedal is free.

2. An attachment for automobiles having a service brake structure and an engine with an intake manifold, comprising a foot pedal connected to said brake structure for actuating the same, said foot pedal having a pointed extension adapted to move back and forth in an arc as said pedal swings back and forth, a swinging toothed lever, a spring for swinging said lever into the path of movement of said extension whereby certain of the teeth thereon will engage said extension and prevent movement of the extension in one direction, a piston connected to said lever, and means for causing suction from said intake manifold to act on said piston to move the same against the action of said spring for moving said lever away from the path of movement of said extension.

3. An attachment for automobiles having a service brake and an engine with an intake manifold, comprising a swinging member operatively connected with the service brake so that when the service brake is moved to a braking position the swinging member will also be moved to a given position, a swinging toothed lever positioned to swing into the path of movement of the swinging member so as to catch and hold the swinging member in said given position whereby the service brake will be locked in braking position, spring means for continually tending to hold the toothed lever in engagement with said swinging member, a piston connected with said toothed member, a cylinder surrounding said piston, a pipe extending from said piston to said intake manifold whereby when said engine is running the suction in the intake manifold is caused to act on said piston for moving said toothed member away from said swinging member, and manually actuated means for admitting air into said cylinder while said engine is running, whereby said toothed member may swing over and interlock with said swinging member during the running of said engine so as to lock said brake without stopping the engine.

4. An attachment for automobiles having a service brake and an engine with an intake manifold, comprising an extension operatively connected with the brake and positioned so that the outer end will swing in an arc of a circle as said brake is moved to and from braking position, a swinging toothed lever positioned to be swung into the path of movement of said extension so as to engage the extension and hold the same against return movement after said brake has been moved to braking position, whereby said service brake may act as a parking brake, and a plurality of means for swinging said toothed member away from said extension in order to release the extension and the service brake.

5. An attachment for automobiles having a service brake and an engine with an intake manifold, comprising a member acting as an extension of the brake pedal forming part of the service brake, said extension being positioned so that the outer end will swing back and forth in an arc when said brake pedal functions, a pivotally mounted member having teeth on one surface, said member being adapted to be swung into the path of movement of said extension for holding the extension in a given position when the service brake has been moved to braking position, pressure operated means for moving said lever away from said extension, and manually actuated means for moving said lever away from said extension.

6. An attachment for automobiles having a service brake and an engine with an intake manifold, comprising a pivotally mounted member connected to said service brake and actuated thereby as the service brake is actuated, said pivotally mounted member having an end adapted to move in an arc of a circle as it swings back and forth, toothed means capable of moving into engagement with said pivotally mounted member for stopping its movement and thereby holding the service brake in braking position, means actuated by suction from said intake manifold for moving said toothed member away from said pivotally mounted member, and auxiliary means for moving said toothed member away from said pivotally mounted member, said auxiliary means including a flexible pull wire, and means for guiding the pull wire.

7. An attachment for automobiles having a service brake and an engine with an intake manifold, comprising means adapted to interlock with part of the service brake to hold the service brake in braking position, and a plurality of independent structures for moving said means to a disengaged position, one of said means including a suction actuated device connected to said intake manifold and the other of said means including a pull wire extending to the instrument board of the automobile for manual actuation.

8. An attachment for automobiles having a service brake and an engine with an intake manifold, comprising means positioned to interlock with part of the service brake for locking the same in braking position, pneumatic means connected with said intake manifold for causing the suction from the intake manifold to move the first mentioned means to an inoperative position, and manually actuated means for admitting air to said pneumatic means, the admission of air to said pneumatic means preventing the pneumatic means from functioning.

LUDWIG L. LUSTICK.